(12) United States Patent
Holtmanns et al.

(10) Patent No.: US 8,037,522 B2
(45) Date of Patent: Oct. 11, 2011

(54) SECURITY LEVEL ESTABLISHMENT UNDER GENERIC BOOTSTRAPPING ARCHITECTURE

(75) Inventors: Silke Holtmanns, Klaukkala (FI); Pekka Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 1203 days.

(21) Appl. No.: 11/727,186

(22) Filed: Mar. 23, 2007

(65) Prior Publication Data
US 2007/0240205 A1   Oct. 11, 2007

Related U.S. Application Data

(60) Provisional application No. 60/787,213, filed on Mar. 30, 2006.

(51) Int. Cl.
*G06G 7/04* (2006.01)
(52) U.S. Cl. .......................... 726/19; 455/411
(58) Field of Classification Search .................. 726/19, 726/5, 14, 15, 17, 29; 713/168, 169, 152, 713/156, 167; 455/411, 433
See application file for complete search history.

(56) References Cited

U.S. PATENT DOCUMENTS

| | | | | |
|---|---|---|---|---|
| 6,748,528 B1* | 6/2004 | Greenfield | .................... | 713/151 |
| 6,807,636 B2* | 10/2004 | Hartman et al. | ................. | 726/14 |
| 7,545,941 B2* | 6/2009 | Sovio et al. | .................... | 380/270 |
| 7,715,822 B2* | 5/2010 | Semple et al. | ................. | 455/411 |
| 7,716,475 B2* | 5/2010 | Asai et al. | ..................... | 713/166 |
| 2005/0086467 A1* | 4/2005 | Asokan et al. | ................ | 713/155 |
| 2005/0182925 A1* | 8/2005 | Tsukamura | .................... | 713/158 |
| 2005/0187649 A1* | 8/2005 | Funk et al. | ..................... | 700/121 |
| 2005/0198529 A1* | 9/2005 | Kitani | ......................... | 713/200 |
| 2005/0257052 A1* | 11/2005 | Asai et al. | ..................... | 713/166 |
| 2006/0068788 A1* | 3/2006 | Zivkovic | ....................... | 455/436 |
| 2006/0085848 A1* | 4/2006 | Aissi et al. | ........................ | 726/9 |
| 2006/0205388 A1* | 9/2006 | Semple et al. | ................. | 455/411 |
| 2006/0218396 A1* | 9/2006 | Laitinen et al. | ............... | 713/167 |
| 2006/0251257 A1* | 11/2006 | Haverinen et al. | ............ | 380/270 |
| 2007/0260877 A1* | 11/2007 | Adams et al. | ................. | 713/156 |
| 2007/0294758 A1* | 12/2007 | Berg et al. | ...................... | 726/14 |

FOREIGN PATENT DOCUMENTS
WO    WO 2004/038665 A1    5/2004

OTHER PUBLICATIONS

ETSI TS 133 222 V70.0, Sep. 2005, 3G PP TS 33.222 version 7.0.0. releage 7, p. 1-22.*
EPO Communication pursuant to Article 94(3) EPC dated Oct. 8, 2009, issued in connection with counterpart EP Application No. 07 735 272.2-2413.

(Continued)

*Primary Examiner* — Eleni Shiferaw
*Assistant Examiner* — Abu Sholeman
(74) *Attorney, Agent, or Firm* — Mintz, Levin, Cohn, Ferris, Glovsky and Popeo, P.C.

(57) ABSTRACT

Security level establishment for an application in a terminal equipment under a generic bootstrapping architecture offering a plurality of different bootstrapping mechanisms, the terminal equipment comprising a credential establishment entity and an application entity, comprising a request for a credential for the application from the application entity to the credential establishment entity and a response from the credential establishment entity to the application entity, wherein the response comprises the requested credential and credential quality information.

28 Claims, 4 Drawing Sheets

OTHER PUBLICATIONS

ETSI TS 133 222 V7.0.0, *Universal Mobile Telecommunications Systems (UMTS); Generic Authentication Architecture (GAA); Access to Network Application Functions Using Hypertext Transfer Protocol Over Transport Layer Security (HTTPS)* (*3GPP TS 33.222 version 7.0.0 Release 7*), Sep. 2005, pp. 1-22.

ETSI TS 133 220 V7.3.0, *Universal Mobile Telecommunications Systems (UMTS); Generic Authentication Architecture (GAA); Generic Bootstrapping Architecture* (*3GPP TS 33.220 version 7.3.0 Release 7*), Mar. 2006, pp. 1-69.

3GPP TR 33.905 V0.2.0, "*3$^{rd}$ Generation Partnership Project; Technical Specification Group Services and System Aspects; Recommendations for Trusted Open Platforms in 3GPP; Release 7; Release 7*", Feb. 2006, pp. 1-12.

3GPP2 S.P0109-0, Version 0.6, "*Generic Bootstrapping Architecture (GBA) Framework*", 3$^{rd}$ Generation Partnership Project 2 "3GPP2", Dec. 2005, pp. 1-59.

Eronen P., et al., "*Pre-Shared Key Ciphersuites for Transport Layer Security (TLS)*", RFC 4279, Dec. 2005, pp. 1-15.

International search report PCT/IB2007/051069 filed Mar. 27, 2007.

\* cited by examiner

SECURITY LEVEL ESTABLISHMENT UNDER GENERIC BOOTSTRAPPING ARCHITECTURE

CROSS-REFERENCE TO RELATED APPLICATIONS

This application claims priority of U.S. Provisional Patent Application Ser. No. 60/787,213 filed on Mar. 30, 2006. The subject matter of this earlier filed application is hereby incorporated by reference.

FIELD OF THE INVENTION

The present invention relates to security level establishment under generic bootstrapping architecture. In particular, the present invention relates to security level establishment for an application in a terminal equipment using a generic bootstrapping architecture that may utilize a plurality of different bootstrapping mechanisms, such as for example SIM-, USIM- and ISIM-based bootstrapping.

BACKGROUND OF THE INVENTION

In recent years, various kinds of communication systems, in particular mobile and/or IP-based (IP: Internet Protocol) communication systems, as well as a multitude of services offered in these systems have been developed.

In such advanced communication systems, such as e.g. Third Generation mobile communication networks currently under development by the Third Generation Partnership Program (3GPP) and the Third Generation Partnership Program 2 (3GPP2), aspects relating to security and trustworthiness are playing a more and more important role.

Starting from the concept of subscriber certificates, which support services that mobile operators provide and whose provision assists mobile operators, and in consideration of a need for more generic security capabilities, 3GPP and 3 GPP2 standardization work lately concentrated on the evolution of a generic authentication architecture (GAA). GAA defines bootstrapping of a shared (symmetric) secret based on specific credentials. As can be gathered from FIG. 1 showing an overview of a generic authentication architecture environment in interrelation with a home subscriber system HSS, a user equipment UE, and a network entity NE, GAA basically consists of three sub-aspects. That is, a generic bootstrapping architecture (GBA), subscriber certificates, and an authentication proxy (AP) e.g. based on HTTPS (Secure Hypertext Transport Protocol). Thereby, the generic bootstrapping architecture (GBA) also builds a basis for both the other sub-aspects in that GBA offers generic authentication capability for various applications based on an application specific shared secret or a public/private key pair. Usually, GBA functions to bootstrap authentication and key agreement for application security, and it is based on the AKA (Authentication and Key Agreement) mechanism.

In FIG. 2, there is illustrated a network model for generic bootstrapping. A bootstrapping server function BSF and the user equipment UE, which are connected via a bidirectional link, mutually authenticate using the AKA protocol, and agree on session keys. These keys are afterwards to be used for a bootstrapping session and to be used between the user equipment and a network application function NAF which is also connected to the user equipment by means of a bidirectional link. After a bootstrapping mechanism selection procedure and a bootstrapping procedure based on a selected bootstrapping mechanism, the user equipment and the network application function can run some application-specific protocol where the security of messages will be based on those session keys generated during mutual authentication. Accordingly, GAA/GBA can in general be regarded as a 3-party authentication scenario, wherein the bootstrapping server function is further connected to a home subscriber system (HSS) or Home Location Register (HLR).

The reference points (interfaces) between the individual entities in FIG. 2 are denoted by Ub, Ua, Zn, and Zh. The interface Zh is based on Diameter and may be based on MAP (not standard), the Zn interface can be based on Diameter or Web Services (i.e., SOAP over HTTP), the interface Ub is based on a reuse of HTTP Digest AKA messages (i.e., 3G authentication with USIM or ISIM) or some variant of it (e.g., 2G GBA of 3 GPP that is based on legacy GSM authentication, and legacy GBA in 3GPP2 that is based on CDMA 1x and CDMA 1x EvDo are all based on HTTP Digest AKA but with some modifications), and the protocol used on the interface Ua depends on the application to be executed.

The utilization of the generic bootstrapping architecture is divided into two phases, i.e. the (generic) bootstrapping procedure as such and the generic bootstrapping usage procedure. The present invention is concerned with the generic bootstrapping usage.

For further details on the generic bootstrapping architecture, reference is made to the document "3GPP TS 33.220, v7.3.0" as for 3GPP standardization and to the document "3GPP2 S.P0109-0, version 0.6" as for 3GPP2 standardization, both being published in December 2005.

SUMMARY OF THE INVENTION

It is an object of the present invention to remove the drawbacks inherent to previous solutions and to provide an accordingly improved system and terminal equipment as well as accordingly improved methods and computer programs for these.

According to a first aspect of the invention, this object is for example achieved by a method of security level establishment for an application in a terminal equipment under a generic bootstrapping architecture offering a plurality of different bootstrapping mechanisms, the terminal equipment comprising a credential establishment entity and an application entity, the method comprising the steps of: sending a request for a credential for the application from the application entity to the credential establishment entity; and returning a response from the credential establishment entity to the application entity, wherein the response comprises the requested credential and credential quality information.

According to further advantageous refinements of the present invention under the above aspect:

the further comprises the step of determining, at the application entity, a security level of the returned credential based on the credential quality information;

the method further comprises the step of comparing, at the application entity, the determined security level of the credential with a desired security level of the application using the returned credential, wherein the application entity refrains from executing the application, for which the returned credential is requested, if the comparing yields that the determined security level of the credential is lower than the desired security level of the application;

the method further comprises the step of notifying a network application function, NAF, entity of the generic bootstrapping architecture about the returned credential quality information;

the credential quality information comprises a type of bootstrapping mechanism on the basis of which the requested credential is generated;

the type of bootstrapping mechanism is one of the following: subscriber identity module, SIM, based type; universal subscriber identity module, USIM, based type; Internet protocol multimedia services subscriber identity module, ISIM, based type; cellular authentication and voice encryption, CAVE, based type; point-to-point challenge handshake authentication protocol, CHAP, based type; removable user identity module, RUIM, based type; or digital certificate based type;

the credential quality information comprises credential deletion information defining at least one condition under which the requested credential is to be deleted at the application entity;

the credential deletion information defines as a condition at least one of the following: removing a smartcard from the terminal equipment; powering-down the terminal device; or revocation of credentials;

the method further comprises the steps of: pushing a credential deletion notice from the credential establishment entity to the application entity that the condition is fulfilled; and deleting the returned credential from the application entity upon receipt of the credential deletion notice;

the method further comprises the steps of: pushing, from the credential establishment entity to the application entity, a credential deletion command for deleting a credential at the application entity; and deleting the credential from the application entity upon receipt of the credential deletion command, wherein the credential deletion command is pushed when a predetermined condition is fulfilled at the credential establishment entity;

the credential establishment entity is a generic authentication architecture server and the application entity is a generic authentication architecture client;

the terminal equipment is based on an open platform environment; and/or the credential establishment entity comprises a generic bootstrapping architecture application programming interface.

According to a second aspect of the invention, this object is for example achieved by a method of operating an application entity in a terminal equipment under a generic bootstrapping architecture offering a plurality of different bootstrapping mechanisms, the method being configured for security level establishment for an application in the terminal equipment, the method comprising the steps of: sending a request for a credential for the application from the application entity to a credential establishment entity of the terminal equipment; and receiving, from the credential establishment entity a response which comprises the requested credential and credential quality information.

Further advantageous refinements of the present invention under the above aspect are in accordance with those as set out in connection with the first aspect.

According to a third aspect of the invention, this object is for example achieved by a method of operating a credential establishment entity in a terminal equipment under a generic bootstrapping architecture offering a plurality of different bootstrapping mechanisms, the method being configured for security level establishment for an application in the terminal equipment, the method comprising the steps of: receiving, from an application entity of the terminal equipment, a request for a credential for the application; acquiring the required credential and credential quality information associated thereto; and returning a response to the application entity, wherein the response comprises the acquired credential and credential quality information.

Further advantageous refinements of the present invention under the above aspect are in accordance with those as set out in connection with the first aspect.

According to a fourth aspect of the invention, this object is for example achieved by a computer program embodied in a computer-readable medium comprising program code configured to perform a security level establishment for an application in a terminal equipment under a generic bootstrapping architecture offering a plurality of different bootstrapping mechanisms, the terminal equipment comprising a credential establishment entity and an application entity, the computer program being configured to perform the steps of: sending a request for a credential for the application from the application entity to the credential establishment entity; and returning a response from the credential establishment entity to the application entity, wherein the response comprises the requested credential and credential quality information.

According to a fifth aspect of the invention, this object is for example achieved by a computer program embodied in a computer-readable medium comprising program code configured to operate an application entity in a terminal equipment under a generic bootstrapping architecture offering a plurality of different bootstrapping mechanisms, the method being configured for security level establishment for an application in the terminal equipment, the computer program being configured to perform the steps of: sending a request for a credential for the application from the application entity to a credential establishment entity of the terminal equipment; and receiving, from the credential establishment entity a response which comprises the requested credential and credential quality information.

According to a sixth aspect of the invention, this object is for example achieved by a computer program embodied in a computer-readable medium comprising program code configured to operate a credential establishment entity in a terminal equipment under a generic bootstrapping architecture offering a plurality of different bootstrapping mechanisms, the method being configured for security level establishment for an application in the terminal equipment, the computer program being configured to perform the steps of: receiving, from an application entity of the terminal equipment, a request for a credential for the application; acquiring the required credential and credential quality information associated thereto; and returning a response to the application entity, wherein the response comprises the acquired credential and credential quality information.

According to a seventh aspect of the invention, this object is for example achieved by a system for security level establishment for an application in a terminal equipment under a generic bootstrapping architecture offering a plurality of different bootstrapping mechanisms, the terminal equipment comprising a credential establishment entity and an application entity, the system comprising: means for sending a request for a credential for the application from the application entity to the credential establishment entity; and means for returning a response from the credential establishment entity to the application entity, wherein the response comprises the requested credential and credential quality information.

According to further advantageous refinements of the present invention under the above aspect:

the system further comprises means for determining, at the application entity, a security level of the returned credential based on the credential quality information;

the system further comprises means for comparing, at the application entity, the determined security level of the credential with a desired security level of the application using the returned credential, wherein the application entity is configured to refrain from executing the application, for which the returned credential is requested, if the comparing yields that the determined security level of the credential is lower than the desired security level of the application;

the system further comprises means for notifying a network application function, NAF, entity of the generic bootstrapping architecture about the returned credential quality information;

the system further comprises means for deleting the returned credential from the application entity, when a predetermined condition is fulfilled;

the credential establishment entity is a generic authentication architecture server and the application entity is a generic authentication architecture client;

the terminal equipment is based on an open platform environment or a closed platform environment; and/or the credential establishment entity comprises a generic bootstrapping architecture application programming interface.

According to an eighth aspect of the invention, this object is for example achieved by an apparatus for security level establishment for an application in a terminal equipment under a generic bootstrapping architecture offering a plurality of different bootstrapping mechanisms, the apparatus comprising a credential establishment entity and an application entity, comprising: means for sending a request for a credential for the application from the application entity to the credential establishment entity; and means for returning a response from the credential establishment entity to the application entity, wherein the response comprises the requested credential and credential quality information.

According to further advantageous refinements of the present invention under the above aspect:

the apparatus further comprises means for determining, at the application entity, a security level of the returned credential based on the credential quality information;

the apparatus further comprises means for comparing, at the application entity, the determined security level of the credential with a desired security level of the application using the returned credential, wherein the application entity is configured to refrain from executing the application, for which the returned credential is requested, if the comparing yields that the determined security level of the credential is lower than the desired security level of the application;

the apparatus further comprises means for notifying a network application function, NAF, entity of the generic bootstrapping architecture about the returned credential quality information;

the apparatus further comprises means for deleting the returned credential from the application entity, when a predetermined condition is fulfilled; and/or the apparatus comprises a terminal equipment.

It is an advantage of the present invention that a security level establishment and differentiation in an application of a terminal equipment is provided.

Based on a corresponding security level differentiation, an internal and external processing of applications, network and services is improved.

It is another advantage of the present invention that no external signaling is necessary, particularly no signaling between an application server and an application in a terminal equipment as well as between the application server and a bootstrapping server.

It is still another advantage of the present invention that an unpromising and/or unauthenticated external service request to a network application function can be avoided. Thereby, signaling overhead and physical resources occupancy is reduced.

Another advantage is that some fraud scenarios are prevented and that the possibility exists to inform the application in the terminal that the application specific credentials it has stored are revoked (e.g. due to cancellation of contract between NAF and operator).

However, the terminal application might still want to indicate to the application server the security level, even if the NAF is contacted this might still improve the performance between NAF and BSF.

BRIEF DESCRIPTION OF THE DRAWINGS

In the following, the present invention will be described in greater detail with reference to the accompanying drawings, in which.

DETAILED DESCRIPTION OF EMBODIMENTS OF THE PRESENT INVENTION

Figure 1:
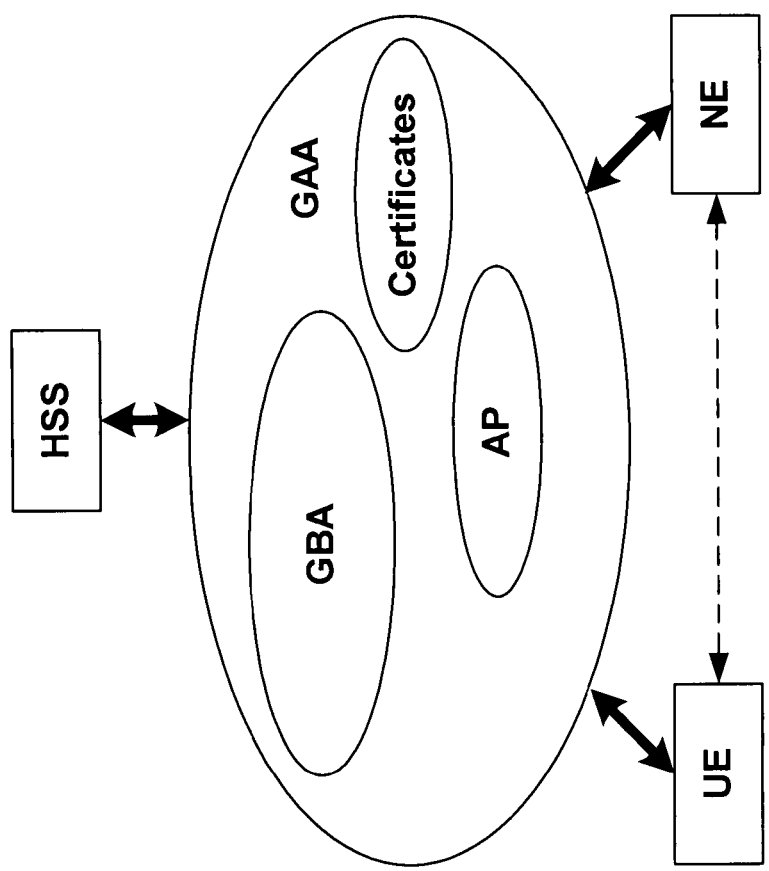
FIG. 1 shows an overview of a generic authentication architecture environment.
Figure 2:
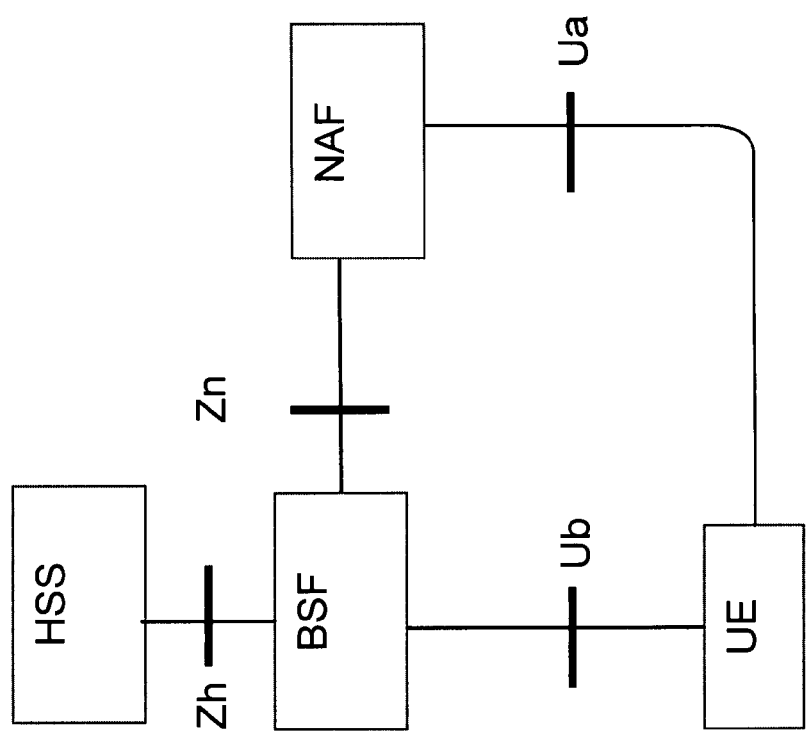
FIG. 2 shows a network model for generic bootstrapping.

The present invention is described herein with reference to particular non-limiting examples. A person skilled in the art will appreciate that the invention is not limited to these examples, and may be more broadly applied.

In particular, the present invention is described in relation to a 3GPP GBA example implementation. For example, the present invention may as well be utilized everywhere where different credential establishment mechanisms are in use. As such, the description of the embodiments given herein specifically refers to terminology which is directly related thereto. Such terminology is only used in the context of the presented examples, and does not limit the invention in any way. In particular, any suitable (today's or future) bootstrapping mechanism may be used for bootstrapping credentials as long as this mechanism complies with the general GBA framework.

When an application in a terminal equipment such as a user equipment UE is to be carried out within a GBA framework, an application entity in the terminal equipment has to contact a respective network application function NAF. For assuring its entitlement for carrying out the desired application, the application entity of the terminal equipment has to authenticate itself by means of certain credentials. The application entity obtains these credentials together with a lifetime information from a credential establishment entity of the terminal equipment, which serves for bootstrapping shared keys (i.e. credentials) between the terminal equipment and a bootstrapping server function BSF of the generic bootstrapping architecture. Upon request, the credential establishment entity provides the application entity with corresponding credentials which are to be used for the desired application. Hence, the application can use the received credentials/keys in any way the application requires e.g. within PSK TLS (RFC 4279).

The trust that an application or application entity puts into the credentials received from the credential establishment entity might depend on the security level inherent to those credentials. However, the application or application entity is according to the known solutions not able to judge about the security level inherent to the received credentials. Especially, for certain applications, which require a particular minimum security level, this situation poses a problem in that the application in the terminal or in the peripheral device (split terminal case, i.e. an external device is connected via local means to the mobile terminal) cannot be sure whether the received credentials are of sufficient quality or their usage is permitted by the application server. Also, an application residing in the terminal might request a service from a NAF without having a sufficient security level. The NAF would then contact the BSF to obtain knowledge of the security level. In the case, that the security level is too low, the current technology leads to quite some network load and decrease general network performance.

In the case that the terminal platform is not open, the application requesting the application specific credentials from the GAA server does not know the used security level. So the only way currently to keep a sufficient security level is not to allow the service. Even if the user obtains a sufficient security level, e.g. by obtaining a new smartcard, the application in the terminal can currently not use the higher security level, since the application would not know that a higher level of security has been reached. Currently, the only possibility is to update the phone software by the manufacturer. The only way to differentiate would be that the operator would provide different kind of phone models, for every bootstrapping type (e.g. card type), different application software would be pre-installed. This would lead to different terminal implementations, depending on the card used, especially updating the card would not be easily possible. Also, the current implementations offer no application specific deletion of keys, e.g. when the card has been removed and would allow fraud.

This problem is even more severe in open platform environments. That is, when a terminal equipment is based on an open platform environment, it is possible to install new applications to the terminal equipment. This may be done by any user of the terminal via an application programming interface (API). The downloaded new application has currently no possibility to know, what kind of smart card is in the device. Hence the security level baseline for the application specific credentials is not known to the application. The application can be specifically customized for each card, but that would require that the user or the operator (but that would not be possible for free open software) state what kind of smart card or security level baseline is used.

Another problem, that is currently not solved is that the application is not aware, when the application specific credentials received from the GAA server should be deleted.

This missing information might lead to the case, that a first user generates application credentials and gives then a second user the smart card, who in turn generates application specific credentials on a second device and hence might obtain a service free of charge.

In summary, there exist problems in the known solutions within a generic bootstrapping architecture that an application of a terminal equipment cannot be sure about the security level inherent to bootstrapped credentials received from a credential establishment entity. Stated in other words, the application just does not know what kind of basis for credential generation was used after having received the application specific credential and it is not aware of any events leading to a invalidity of the received credentials.

Thus, a solution to the above problems is needed for providing security level establishment for an application in a terminal equipment under a generic bootstrapping architecture.

Figure 3:
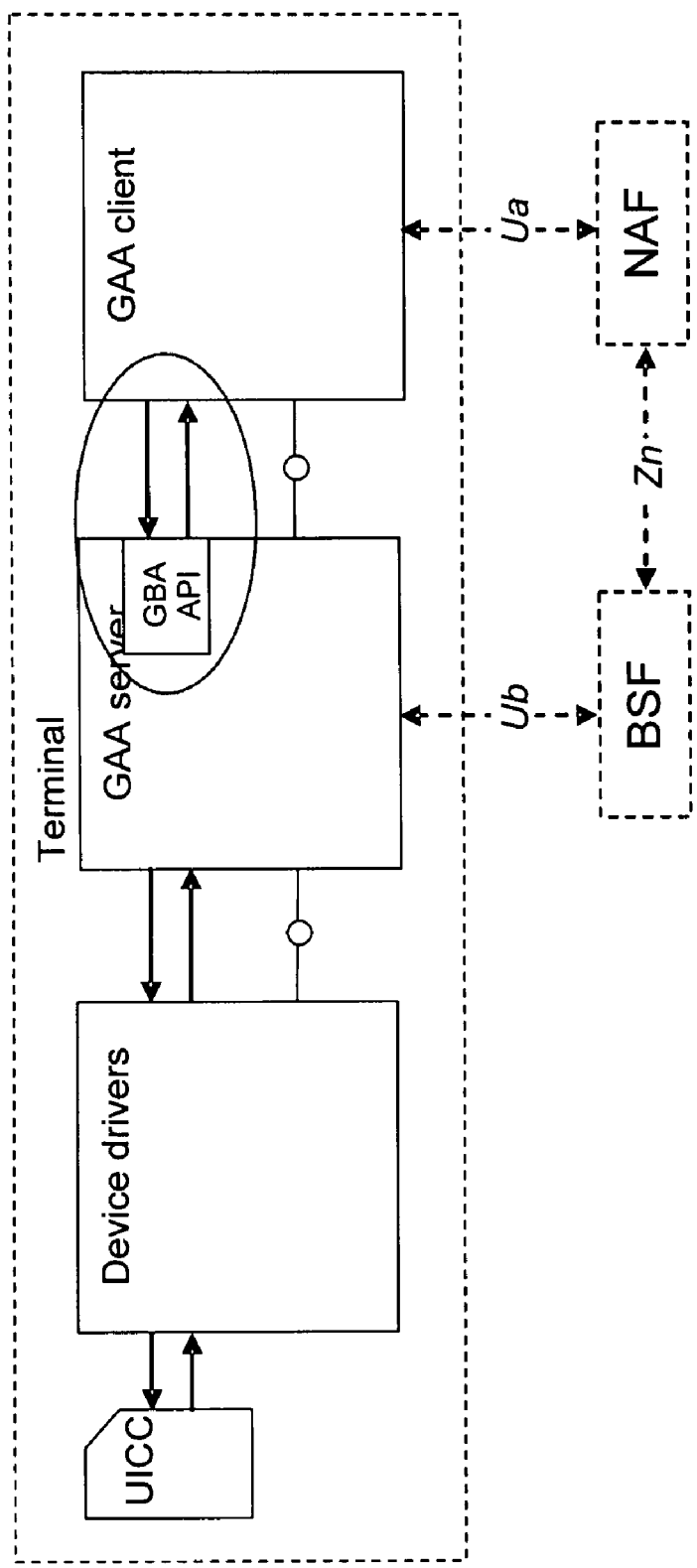
FIG. 3 shows a schematic block diagram of a generic bootstrapping architecture with a terminal equipment according to the present invention.

FIG. 3 shows a schematic block diagram of a generic bootstrapping architecture with a terminal equipment according to the present invention. The terminal equipment is illustrated to be based on a (trusted) open platform environment, such as for example Symbian or Series60.

According to FIG. 3, the terminal equipment comprises a GAA server acting as a credential establishment entity (in terms of e.g. GBA_ME or GBA_U), a GAA client acting as an application entity, device drivers (which represent a conventional implementation detail and are not relevant for the present invention), and a smartcard which can bean UICC (Universal Integrated Circuits Card) or a SIM (Subscriber Identity Module) card or some other form of secure storage, like trusted computing platform.

The smartcard can be to be a multi-application card on which several different applications run, which define different bootstrapping mechanisms. By means of these different bootstrapping mechanisms of the UICC, the GAA server is able to bootstrap specific credentials in cooperation with a bootstrapping server function BSF over the network interface Ub. Since the present invention does not relate to the bootstrapping mechanism as such, no description thereof will be given herein. Examples of known bootstrapping mechanisms include bootstrapping based on a subscriber identity module SIM, a universal subscriber identity module USIM, an Internet protocol multimedia services subscriber identity module ISIM, a cellular authentication and voice encryption CAVE, a point-to-point (PPP) challenge handshake authentication protocol CHAP, a removable user identity module RUIM, a digital certificate, a private/public key pair, other form of cryptographic master key, or username/password based schemes. Apart from the known bootstrapping mechanisms mentioned above, the present invention is generally also applicable to any other suitable bootstrapping mechanism, including future bootstrapping mechanisms.

The GAA server is either part of the platform of the terminal equipment, or is e.g. downloaded to the terminal equipment after it has been sold. As required for an open terminal platform under generic bootstrapping architecture, the GAA server comprises a generic bootstrapping architecture application programming interface denoted by GBA API. The GBA API interfaces the GAA server with the GAA client. The GBA server takes care that the GBA master key can be established, from which NAF-specific keys are deduced, and hands out the needed NAF-specific keys (credentials). The GAA client interacts with a network application function NAF over the network interface Ua for executing network applications as explained above.

According to the present embodiment of the invention, the GAA client as the application entity sends a request to the GBA API (indicated by a respective arrow). By way of such a request, the GAA client requests at least one credential from the GAA server, which is needed at the GAA client for execution of a certain application. Upon such a request, the GAA client (via the GBA API) returns the requested credential(s), which is/are retrieved from a respective credential storage of the GBA server or the smart card. This returning operation is platform-dependent. According to the bootstrapping mechanism used, the returned credential is of a particular bootstrapping type. In its response to the GAA client (indicated by a respective arrow), the GAA server in addition to the requested credential (and possible its lifetime) also includes credential quality information. This credential quality information indicates the type of bootstrapping mechanism on the basis of which the returned credential is generated, such as for example SIM-, USIM-, ISIM-, RUIM-, CAVE-, CHAP-, certificate-, or password based. In case of any other bootstrapping mechanism being used, the type of this mechanism is indicated, including future bootstrapping mechanisms. The master credentials can be stored on different media e.g. secure memory, smart card or other trusted environment.

By way of this additional credential quality information according to the present invention, the GAA client, i.e. the application entity, is enabled to determine the security level of the returned credential, and thus the security level of the application executed using this credential.

Further, the GAA client is able to compare the determined security level of the credential with a desired security level of the application to be executed using the returned credential. If the determined security level is lower than the desired security level, the GAA client is operable to decide e.g. to refrain from executing the application. Thus, no service request for this application is to be sent to the NAF entity in the network, whereby physical resources are spared and costs are avoided for the user. On the other hand, if the determined security level is higher than the desired security level, the application is ensured to be sufficiently secure with regard to its requirements. For example, a certain application e.g. broadcast application (e.g., 3GPP MBMS) may require at minimum a USIM-based credential, thus not being executed when the returned credential is only of SIM-based bootstrapping type. This prevents that the terminal contacts the service (and may establish a connection that is charged) for a service, that can not be obtained with that level of security.

From the point of view of application designers (for open platform terminal equipment) the functionality according to embodiments of the present invention is important as they can deduce the authentication quality in the GAA client (i.e. part of the application) from information received upon a credential request and the application takes into account the level of security (e.g. by limiting the service scope). The application is only executed and possible costs are generated for the user, if the security level matches or is higher and there is a reasonable chance for the user to obtain actually the service. This allows the application designers to take into account specifics that are due to 3GPP- or 3GPP2-specific GBA information (e.g. hacked algorithms or general strength of used algorithms). Namely, the GAA client is able to detect whether 3GPP bootstrapping is based on Second Generation (2G) specifics (e.g. SIM) or Third Generation (3G) specifics (e.g. USIM, ISIM), or whether 3GPP2 based bootstrapping is based on CAVE (i.e. CDMA 1×), CHAP (i.e. CDMA 1× EvDo), or AKA (e.g., USIM) or some other not yet standardized means.

As a further aspect of the present embodiment, the GAA client in the terminal equipment notifies the NAF entity of the generic bootstrapping architecture about the returned credential quality information, i.e. the bootstrapping type of the returned credential. Thereby, it can be avoided that that the NAF entity has to retrieve the bootstrapping type information from the BSF entity, thus preventing unnecessary backend signaling, if desired.

This is for example particularly interesting for the roaming case, where the NAF entity is not located in the user's (i.e. terminal equipment's) home network and the NAF entity wants to know directly at the first contact (i.e. the GAA client sending a service request including respective credentials for its authentication), what type of bootstrapping has been used to generate the credentials. Then, the NAF entity is operable to decide whether it will trust the credential quality information from the terminal equipment, and if yes, whether the credentials are of a sufficiently high security level.

In addition or alternatively to the credential quality information, the response from the GAA server to the GAA client according to an embodiment of the present invention comprises credential deletion information. The credential deletion information according to this embodiment defines at least one condition under which the requested and returned credential becomes invalid, and thus is to be deleted at the GAA client (or all of the GAA clients in the terminal equipment).

In contrast to conventional lifetime information, this credential deletion information defines an actual expiry date that is bound to a condition or event (revocation of credential, removal of smart card, device power down), and not a theoretical one that is set during key generation. That is, although the lifetime of a credential has not yet passed, it may expire immediately due to a certain event. For example when the smartcard is removed from the terminal equipment or when the terminal equipment is powered down or when the associated application is closed or when the used and/or stored credential is revoked, certain credentials' validity may expire in order to ensure security and prevent security threats. Thus, the credential deletion information according to this aspect of the present invention represents an alterable freshness information. Usually, an application in the terminal would not be aware that, for example, the credentials are revoked or the smart card has been removed, hence it would not know, that it is supposed to delete the stored application specific credentials. Thereby, a fraud scenario can be prevented, where a user of the (first) terminal equipment generates a first set of credentials in the first terminal equipment using the UICC, the application gets these credentials from the UICC via GAA server and GBA API, and then the user removes the UICC from this first terminal equipment and inserts the same UICC into a new (second) terminal equipment in order to generate another set of credentials with the same UICC, while the first terminal equipment still using the first set of credentials. This e.g. prevents that a UICC is plugged into another terminal equipment to obtain a service for free.

If such credential deletion information is returned to the GAA client i.e. GAA using application in the terminal, the GAA client is operable to delete the specified credential upon the defined condition is fulfilled or the defined event takes place. This can for example be implemented as a callback function to the GAA client. That is, whenever a GAA client is expected to delete GBA-related credentials obtained earlier from the GAA server, the GAA server calls a callback function on a specific or all GAA clients that have registered with the GAA server.

As regards credential deletion, generally speaking there are two scenarios bring covered by embodiments of the present invention:

a) a condition for deletion is pushed from the GAA server to the GAA client, then the event happens (i.e. the condition is fulfilled), then the GAA server pushes the information that the event has occurred, then the application (GAA client) reacts according to the event (condition); or b) an event takes place (at the GAA server), then the GAA server just pushes a delete command to the GAA client without being informed in advance about potential deletion conditions.

For case a), the credential quality information comprises credential deletion information defining at least one condition under which the requested credential is to be deleted at the application entity. The credential deletion information defines as a condition at least one of the following:

removing a smartcard from the terminal equipment;
  powering-down the terminal device; or
  revocation of credentials.

Then, the GAA server pushes a credential deletion notice from the credential establishment entity to the application entity that the condition is fulfilled, and, the GAA client deletes the returned credential from the application entity upon receipt of the credential deletion notice.

For case b), the GAA server pushes to the GAA client a credential deletion command for deleting a credential at the application entity, when a predetermined condition is fulfilled at the GAA server. Upon receipt of the credential deletion command, the GAA client deletes the credential.

Such deletion procedures may also occur in an unsolicited manner. That is, if a respective condition is fulfilled, the GAA server pushes a credential deletion command or a credential deletion notice to the GAA client, even if no credential request has occurred beforehand.

Although the principles of the present invention are described above in terms of method steps, embodiments of the present invention also include corresponding software implementations in the form of computer programs and hardware implementations in the form of respective entities, systems and terminals.

Figure 4:
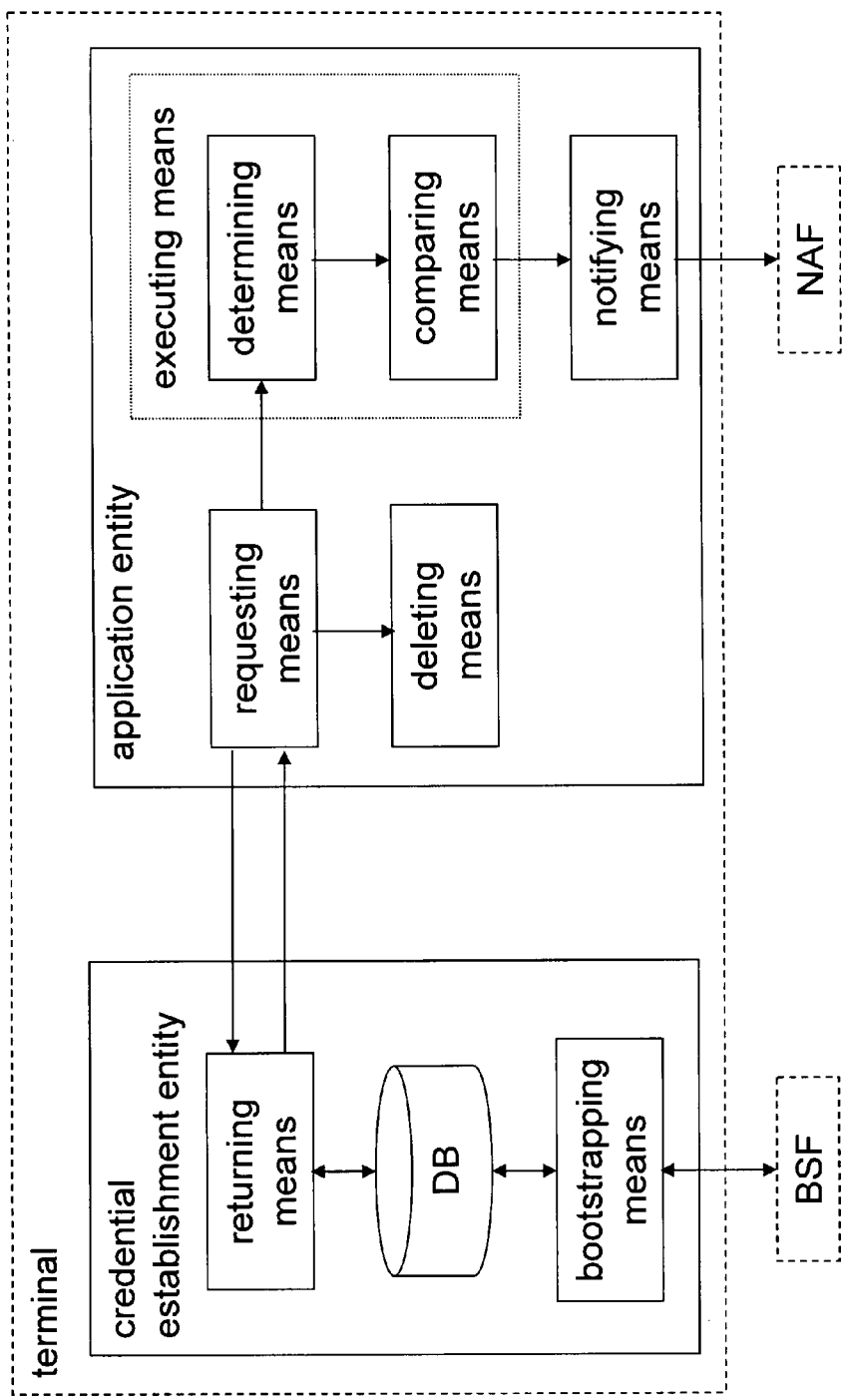
FIG. 4 shows a schematic block diagram of a system according to the present invention.

FIG. 4 shows a schematic block diagram of a system according to the present invention by means of example only. The system forms part of a terminal equipment according to the present invention.

According to FIG. 4, a system of the present embodiment comprises a credential establishment entity such as a GAA server and an application entity such as a GAA client. For the sake of simplicity, a GBA application programming interface like that in FIG. 3 has been omitted in this figure. However, a skilled person would know from general knowledge as to how such a GBA API is located within an implementation of the credential establishment entity.

Both entities depicted in FIG. 4 are operable according to the methods as set out above or in the appended claims. To this end, the respective means of each entity are configured to perform method steps with similar denotation. It is to be noted that the entities according to certain embodiments of the present invention do not necessarily have to comprise any of the means as depicted in FIG. 4, but any combination thereof is conceivable.

In detail, the application entity comprises requesting means being configured to send a request for certain credentials, which the application entity requires, to the credential establishment entity. On the application entity side, determining means are configured to determine, upon receipt of a response including credential quality information and possible credential deletion information, a security level of the returned credential. Further, comparing means are configured to compare a security level determined by the determining means with a desired security level of the application to be executed by the application entity. In case the comparison yields that the returned security level is equal to or higher than the desired security, then executing means of the application entity are configured to execute the desired application using the returned credentials. Otherwise, the application will not be executed. If a certain event takes place, e.g. the GAA server receives a revocation request, smart card is removed, device powered down, this event information is pushed to the GAA client via the GBA API, so that these can take appropriate measures e.g. delete the keys.

Notifying means, which are an optional constituent of the application entity, are configured to notify the returned credential quality information and/or the determined security level to a network application function, i.e. a NAF server.

Furthermore, the application entity optionally comprises deleting means being configured to delete the credentials of the application entity. The deleting means are operable on the basis of associated credential deletion information, returned together with the credentials from the credential establishment entity, and certain conditions or events as specified by the credential deletion information, such as for example removal of the smartcard from the terminal equipment, power down of device or revocation push from BSF.

The credential establishment entity comprises returning means being configured to return, upon request from the requesting means of the application entity, requested credentials together with credential quality information and/or credential deletion information as specified above. To this end, the returning means are further configured to retrieve these pieces of information from a secure storage denoted by DB, which may for example be a directory in UICC, some secure trusted computing hardware or secure memory, where they are stored on the credential establishment entity side.

The contents of the secure storage, i.e. shared symmetrical keys (credential) based on GBA as well as corresponding lifetime information, quality information and deletion information, originates from generic bootstrapping. The generic bootstrapping is performed by a bootstrapping means of the credential establishment entity of the terminal and a bootstrapping server function, i.e. a BSF server. Then, the bootstrapping means store the bootstrapped information into the secure storage for future use, e.g. by the returning means.

Furthermore, the returning means are configured to push a credential deletion notice to the GAA client that a credential deletion condition is fulfilled, or to push a credential deletion command for deleting a credential at the GAA client, from the GAA server to the GAA client, wherein the credential deletion command is pushed when a predetermined condition is fulfilled at the GAA server.

In general, it is also to be noted that the mentioned functional elements, e.g. requesting means or managing returning according to the present invention can be implemented by any known means, either in integrated or removable hardware and/or software, respectively, if it is only adapted to perform the described functions of the respective parts. For example, the returning means of the credential establishment entity can be implemented by any data processing unit, e.g. a microprocessor, being configured to retrieve and return requested credentials and associated quality information as defined by the appended claims. The mentioned parts can also be realized in individual functional blocks or by individual devices, or one or more of the mentioned parts can be realized in a single functional block or by a single device. Correspondingly, the above illustration of FIG. 4 is only for illustrative purposes and does not restrict an implementation of the present invention in any way.

Furthermore, method steps likely to be implemented as software code portions and being run using a processor at one of the entities are software code independent and can be specified using any known or future developed programming language such as e.g. Java, C, C++, and Assembler. Method steps and/or devices or means likely to be implemented as hardware components at one of the peer entities are hardware independent and can be implemented using any known or future developed hardware technology or any hybrids of these, such as MOS, CMOS, BiCMOS, ECL, TTL, UICC, TCB (Trusted computing base) etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. For example, the GAA client might reside in a secondary entity, like a PC and calls the GAA server through a local interface e.g. via Bluetooth or WLAN (Wireless Local Area Network). Such and similar principles are to be considered as known to those skilled in the art.

According to the present invention and its embodiments, there is provided security level establishment for an application in a terminal equipment under a generic bootstrapping architecture offering a plurality of different bootstrapping mechanisms, the terminal equipment comprising a credential establishment entity and an application entity, comprising a request for a credential for the application from the application entity to the credential establishment entity and a response from the credential establishment entity to the application entity, wherein the response comprises the requested credential information (i.e. key identifier, keys, key lifetime) and credential quality information.

The invention describes a new functionality between a credential establishment entity (e.g. a GAA server) and an application entity (e.g. a GAA client), which functionality indicates the credential quality. The trust that an application puts into received credentials might thus depend on the bootstrapping type and the actual expiry point of time. Hence, the application may require a certain security level, especially no service request should be made, when the credentials have been revoked, the security level is to low or the credentials are no longer be valid due to certain events.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

The invention claimed:

1. A method comprising:
sending a request for a credential for an application in a terminal equipment from an application entity of the terminal equipment to a credential establishment entity of the terminal equipment;
returning a response from the credential establishment entity to the application entity, wherein the response comprises the returned credential and credential quality information;
determining, at the application entity, a security level of the returned credential based on the credential quality information;
comparing, at the application entity, the determined security level of the credential with a desired security level of the application using the returned credential, wherein the application entity refrains from executing the application, for which the returned credential is requested, if the comparing yields that the determined security level of the credential is lower than the desired security level of the application; and
establishing a security level for the application in the terminal equipment under a generic bootstrapping architecture offering a plurality of different bootstrapping mechanisms.

2. The method according to claim 1, further comprising: notifying a network application function entity of the generic bootstrapping architecture about the returned credential quality information.

3. The method according to claim 1, wherein the credential quality information comprises a type of bootstrapping mechanism on the basis of which the requested credential is generated.

4. The method according to claim 3, wherein the type of bootstrapping mechanism is one of the following: subscriber identity module based type; universal subscriber identity module based type; Internet protocol multimedia services subscriber identity module based type; cellular authentication and voice encryption based type; point-to-point challenge handshake authentication protocol based type; removable user identity module based type; or digital certificate based type.

5. The method according to claim 1, wherein the credential quality information comprises credential deletion information defining at least one condition under which the requested credential is to be deleted at the application entity.

6. The method according to claim 5, wherein the credential deletion information defines as a condition at least one of the following: removing a smartcard from the terminal equipment; powering-down the terminal device; or revocation of credentials.

7. The method according to claim 5, further comprising: pushing a credential deletion notice from the credential establishment entity to the application entity that the condition is fulfilled; and deleting the returned credential from the application entity upon receipt of the credential deletion notice.

8. The method according to claim 1, further comprising: pushing, from the credential establishment entity to the application entity, a credential deletion command for deleting a credential at the application entity; and deleting the credential from the application entity upon receipt of the credential deletion command, wherein the credential deletion command is pushed when a predetermined condition is fulfilled at the credential establishment entity.

9. The method according to claim 1, wherein the credential establishment entity is a generic authentication architecture server and the application entity is a generic authentication architecture client.

10. The method according to claim 1, wherein the terminal equipment is based on an open platform environment.

11. The method according to claim 10, wherein the credential establishment entity comprises a generic bootstrapping architecture application programming interface.

12. A method comprising:
sending, by an application entity in a terminal equipment, a request for a credential for an application in the terminal equipment from the application entity to a credential establishment entity of the terminal equipment, wherein the terminal equipment comprises the application entity and the credential establishment entity;
receiving, from the credential establishment entity a response which comprises the requested credential and credential quality information;
determining a security level of the received credential based on the credential quality information;
comparing the determined security level of the credential with a desired security level of the application using the returned credential, wherein the application entity refrains from executing the application, for which the returned credential is requested, if the comparing yields that the determined security level of the credential is lower than the desired security level of the application; and establishing a security level for the application in the terminal equipment under a generic bootstrapping architecture offering a plurality of different bootstrapping mechanisms.

13. The method according to claim 12, further comprising: notifying a network application function entity of the generic bootstrapping architecture about the returned credential quality information.

14. The method according to claim 12, further comprising: deleting the returned credential from the application entity, when a predetermined condition is fulfilled.

15. The method according to claim 12, wherein the application entity is a generic authentication architecture client.

16. A computer program embodied on a non-transitory computer-readable medium comprising program code configured to perform operations comprising:

sending a request for a credential for an application in a terminal equipment from an application entity of the terminal equipment to a credential establishment entity of the terminal equipment;

returning a response from the credential establishment entity to the application entity, wherein the response comprises the returned credential and credential quality information;

determining, at the application entity, a security level of the returned credential based on the credential quality information;

comparing, at the application entity, the determined security level of the credential with a desired security level of the application using the returned credential, wherein the application entity refrains from executing the application, for which the returned credential is requested, if the comparing yields that the determined security level of the credential is lower than the desired security level of the application; and establishing a security level for the application in the terminal equipment under a generic bootstrapping architecture offering a plurality of different bootstrapping mechanisms.

17. A computer program embodied in a non-transitory computer-readable medium comprising program code configured to perform operations comprising:

sending, by an application entity in a terminal equipment, a request for a credential for an application in the terminal equipment from the application entity to a credential establishment entity of the terminal equipment, wherein the terminal equipment comprises the application entity and the credential establishment entity;

receiving, from the credential establishment entity a response which comprises the requested credential and credential quality information;

determining a security level of the received credential based on the credential quality information;

comparing the determined security level of the credential with a desired security level of the application using the returned credential, wherein the application entity refrains from executing the application, for which the returned credential is requested, if the comparing yields that the determined security level of the credential is lower than the desired security level of the application; and establishing a security level for the application under a generic bootstrapping architecture offering a plurality of different bootstrapping mechanisms.

18. An apparatus comprising:

at least one processor; and at least one memory including code which when executed by the processor provides operations comprising:

sending a request for a credential for an application in a terminal equipment from an application entity of the terminal equipment to a credential establishment entity of the terminal equipment;

returning a response from the credential establishment entity to the application entity, wherein the response comprises the requested returned credential and credential quality information;

determining, at the application entity, a security level of the returned credential based on the credential quality information;

comparing, at the application entity, the determined security level of the credential with a desired security level of the application using the returned credential, wherein the application entity is configured to refrain from executing the application, for which the returned credential is requested, if the comparing yields that the determined security level of the credential is lower than the desired security level of the application; and establishing a security level for the application in the terminal equipment under a generic bootstrapping architecture offering a plurality of different bootstrapping mechanisms.

19. The apparatus according to claim 18, further comprising: notifying a network application function entity of the generic bootstrapping architecture about the returned credential quality information.

20. The apparatus according to claim 18, further comprising: deleting the returned credential from the application entity, when a predetermined condition is fulfilled.

21. The apparatus according to claim 18, wherein the credential establishment entity is a generic authentication architecture server and the application entity is a generic authentication architecture client.

22. The apparatus according to claim 18, wherein the terminal equipment is based on an open platform environment.

23. The apparatus according to claim 18, wherein the terminal equipment is based on a closed platform environment.

24. The apparatus according to claim 22, wherein the credential establishment entity comprises a generic bootstrapping architecture application programming interface.

25. An apparatus, comprising:

at least one processor; and at least one memory including code which when executed by the processor provides operations comprising:

sending, by an application entity in a terminal equipment, a request for a credential for an application in the terminal equipment from the application entity to a credential establishment entity of the terminal equipment, wherein the terminal equipment comprises the application entity and the credential establishment entity;

receiving, from the credential establishment entity a response which comprises the requested credential and credential quality information;

determining, at the application entity, a security level of the returned credential based on the credential quality information;

comparing, at the application entity, the determined security level of the credential with a desired security level of the application using the returned credential, wherein the application entity is configured to refrain from executing the application, for which the returned credential is requested, if the comparing yields that the determined security level of the credential is lower than the desired security level of the application; and establishing a security level for the application in the terminal equipment under a generic bootstrapping architecture offering a plurality of different bootstrapping mechanisms.

26. The apparatus according to claim 25, further comprising:
  notifying a network application function entity of the generic bootstrapping architecture about the returned credential quality information.

27. The apparatus according to claim 25, further comprising: deleting the returned credential from the application entity, when a predetermined condition is fulfilled.

28. The apparatus according to claim 25, wherein the apparatus comprises a terminal equipment.

* * * * *